United States Patent [19]
Tuson et al.

[11] Patent Number: 5,755,818
[45] Date of Patent: May 26, 1998

[54] STAGED COMBUSTION METHOD

[75] Inventors: Geoffrey Bruce Tuson, Yorktown Heights; Ronald William Schroeder, Chappaqua; Hisashi Kobayashi, Putnam Valley, all of N.Y.

[73] Assignee: Praxair Technology, Inc., Danbury, Conn.

[21] Appl. No.: 489,910

[22] Filed: Jun. 13, 1995

[51] Int. Cl.⁶ .................................................... F23M 3/04
[52] U.S. Cl. ............................ 431/10; 431/190; 432/22
[58] Field of Search ........................... 432/19–23; 431/10, 431/190

[56] References Cited

U.S. PATENT DOCUMENTS

| | | | |
|---|---|---|---|
| 3,074,707 | 1/1963 | Humphries et al. | 432/22 |
| 4,541,796 | 9/1985 | Anderson | 431/187 |
| 4,957,050 | 9/1990 | Ho | 110/346 |
| 5,076,779 | 12/1991 | Kobayashi | 431/5 |
| 5,176,086 | 1/1993 | Clark et al. | 110/346 |
| 5,186,617 | 2/1993 | Ho | 431/9 |
| 5,242,296 | 9/1993 | Tuson et al. | 431/10 |
| 5,295,816 | 3/1994 | Kobayashi et al. | 431/9 |
| 5,383,782 | 1/1995 | Yap | 432/22 |
| 5,387,100 | 2/1995 | Kobayashi et al. | 431/10 |
| 5,411,395 | 5/1995 | Kobayashi et al. | 431/187 |
| 5,431,559 | 7/1995 | Taylor | 431/164 |
| 5,439,373 | 8/1995 | Anderson et al. | 431/10 |
| 5,601,425 | 2/1997 | Kobayashi et al. | 431/10 |

*Primary Examiner*—Carroll B. Dority
*Attorney, Agent, or Firm*—Stanley Ktorides

[57] ABSTRACT

An improved staged combustion method useful with oxy-fuel combustion and in a furnace which contains a charge, wherein substoichiometric combustion and secondary oxidant injection are carried out in an orientation which forms a more oxidizing or a more reducing atmosphere proximate the charge surface than would be the case with a homogeneous furnace atmosphere.

5 Claims, 1 Drawing Sheet

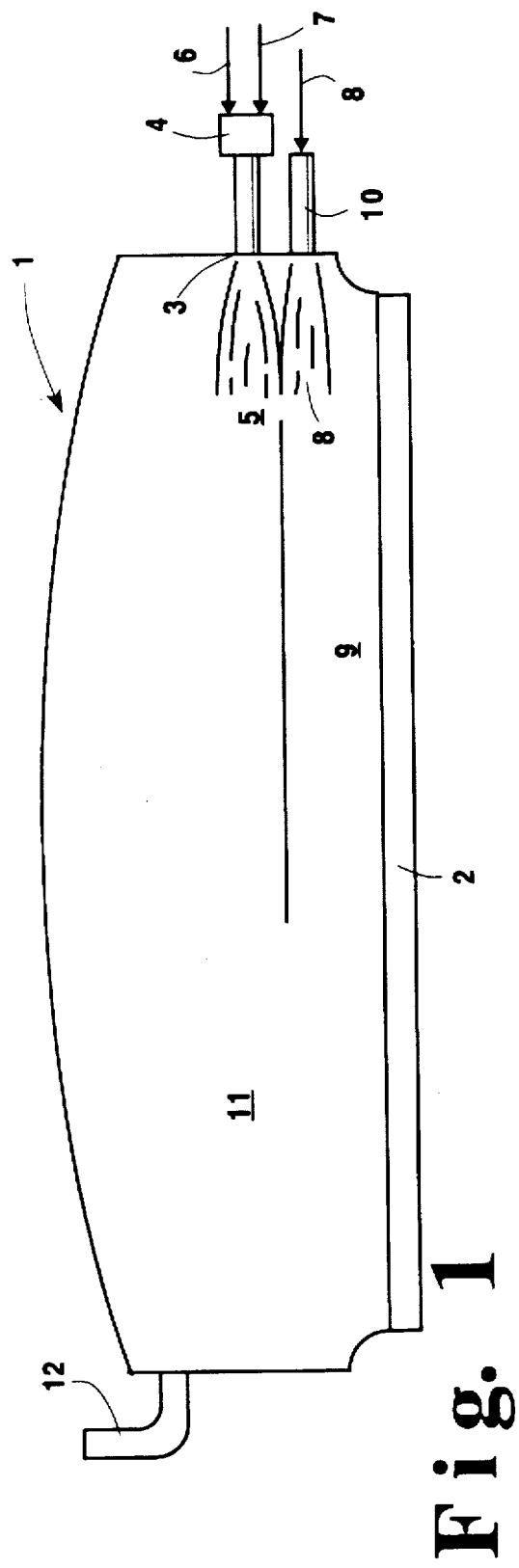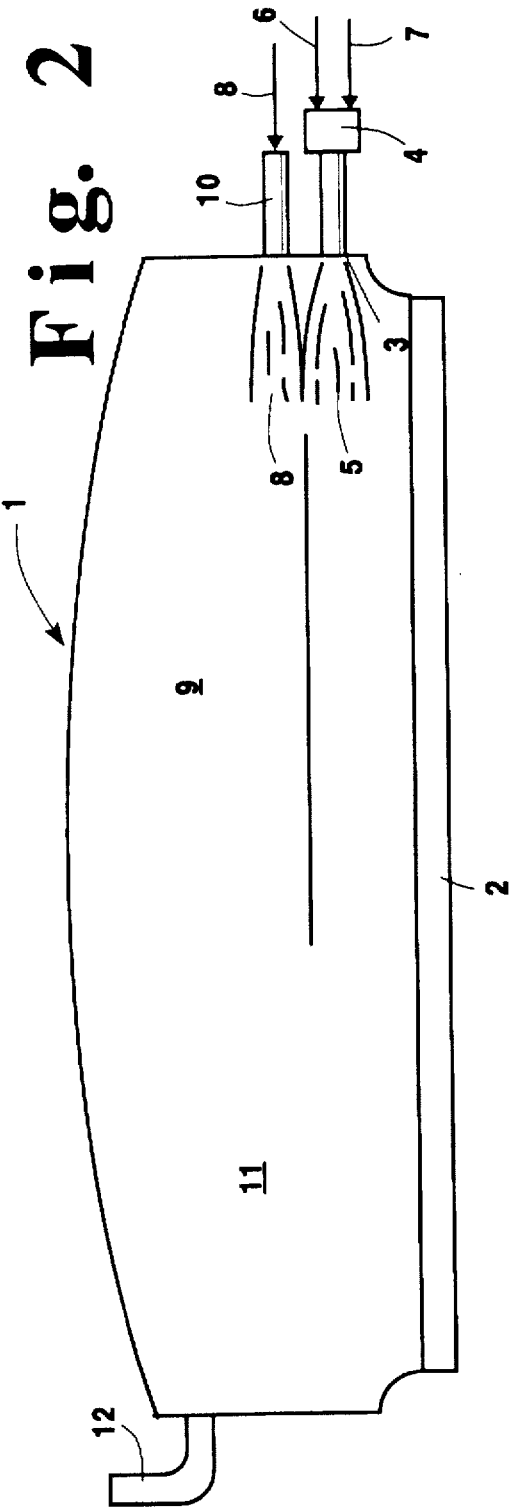

5,755,818

1

STAGED COMBUSTION METHOD

TECHNICAL FIELD

This invention relates generally to staged combustion within a furnace which contains a charge to be heated by heat generated by the combustion.

BACKGROUND ART

Nitrogen oxides (NOx) are a significant pollutant generated during combustion and it is desirable to reduce their generation in carrying out combustion. It is known that combustion may be carried out with reduced NOx generation by using technically pure oxygen or oxygen-enriched air as the oxidant as this reduces the amount of nitrogen provided to the combustion reaction on an equivalent oxygen basis. However the use of an oxidant having a higher oxygen concentration than that of air causes the combustion reaction to run at a higher temperature and this higher temperature kinetically favors the formation of NOx.

Staged combustion has been used to reduce NOx generation, particularly when the oxidant is a fluid having an oxygen concentration which exceeds that of air. In staged combustion, fuel and oxidant are introduced into a combustion zone in a substoichiometric ratio and combusted. Due to the excess amount of fuel available for combustion, very few of the oxygen molecules of the oxidant react with nitrogen to form NOx. Additional oxygen is provided to the combustion zone to complete the combustion in a second downstream stage. Because the secondary oxygen is first diluted with furnace gases before it mixes with the unburned fuel, the combustion in the second stage does not occur at very high temperatures, thus limiting the amount of NOx formed.

In order to carry out effective combustion with oxidant having a higher oxygen concentration than that of air, the fuel and/or oxidant must be provided into the furnace at a relatively high velocity in order to achieve the requisite momentum. The combustion reactants must have a certain momentum in order to assure adequate mixing of the fuel and oxidant for efficient combustion. The high momentum also causes the combustion reaction products to more effectively spread throughout the furnace to transfer heat to the furnace charge. Momentum is the product of mass and velocity. An oxidant having an oxygen concentration which exceeds that of air will have a lower mass than air on an equivalent oxygen molecule basis. For example, an oxidant fluid having an oxygen concentration of 30 mole percent will have about 70 percent the mass of an oxidatively equivalent amount of air. Accordingly, in order to maintain the requisite momentum, the velocity of the combustion reaction, i.e. the velocity of the fuel and/or oxidant of the combustion reaction, must be correspondingly higher.

In many industrial furnace operations, the high velocity and consequent vigorous mixing and spread of the combustion reaction products within the furnace is not disadvantageous. However, in some situations it may be desirable to maintain one or more of the combustion reaction products from contacting the charge. For example, one or more of the combustion reaction products could chemically react with the charge in an unwanted chemical reaction. This problem may be overcome by interposing a physical barrier between the combustion reaction and the charge, but this solution imposes a significant energy penalty on the furnace operation even when the barrier is made of material having good heat transfer properties.

In addition it may be desirable to establish a more oxidizing atmosphere or a more reducing atmosphere

2 directly above the charge than would be the case if the atmosphere within the furnace were homogeneous.

Accordingly, it is an object of this invention to provide an improved staged combustion method wherein fuel and oxidant combust in a combustion reaction having the requisite momentum, with the charge being protected from deleterious contact with combustion reaction products while still ensuring good heat transfer from the combustion reaction to the charge.

It is another object of this invention to provide an improved staged combustion method wherein a more oxidizing or a more reducing atmosphere is established directly over the charge.

SUMMARY OF THE INVENTION

The above and other objects, which will become apparent to those skilled in the art upon a reading of this disclosure, are attained by the present invention, one aspect of which is:

A method for carrying out staged combustion comprising:

(A) injecting into a furnace which contains a charge, at a point above the charge, fuel and primary oxidant in a substoichiometric ratio not exceeding 70 percent of stoichiometric, said primary oxidant being a fluid comprising at least 50 mole percent oxygen, at least one of said fuel and primary oxidant being injected into the furnace at a velocity exceeding 100 feet per second;

(B) combusting fuel and primary oxidant within the furnace to produce heat and combustion reaction products including unburned fuel;

(C) providing secondary oxidant within the furnace between the charge and the injection point of the fuel and primary oxidant, said secondary oxidant being a fluid comprising at least 50 mole percent oxygen, at a velocity exceeding 100 feet per second;

(D) establishing a secondary oxidant gas layer proximate the charge, said secondary oxidant gas layer being more oxidizing to the charge than the combustion reaction products; and (E) combusting secondary oxidant with unburned fuel to provide additional heat and combustion reaction products within the furnace.

Another aspect of the invention is:

A method for carrying out staged combustion comprising:

(A) injecting into a furnace which contains a charge, at a point above the charge, fuel and primary oxidant in a substoichiometric ratio not exceeding 70 percent of stoichiometric, said primary oxidant being a fluid comprising at least 50 mole percent oxygen, at least one of said fuel and primary oxidant being injected into the furnace at a velocity exceeding 100 feet per second;

(B) combusting fuel and primary oxidant within the furnace to produce heat and combustion reaction products including unburned fuel;

(C) providing secondary oxidant within the furnace above the injection point of the fuel and primary oxidant, said secondary oxidant being a fluid comprising at least 50 mole percent oxygen, at a velocity exceeding 100 feet per second;

(D) establishing a fuel rich gas layer proximate the charge, said fuel rich gas layer being more reducing to the charge than the secondary oxidant; and (E) combusting secondary oxidant with unburned fuel to provide additional heat and combustion reaction products within the furnace.

As used herein the term "products of complete combustion" means one or more of carbon dioxide and water vapor.

As used herein the term "products of incomplete combustion" means one or more of carbon monoxide, hydrogen, carbon and partially combusted hydrocarbons.

As used herein the term "unburned fuel" means fuel which has undergone no combustion and/or products of incomplete combustion.

As used herein the term "stoichiometric" means the ratio of oxygen to fuel for combustion purposes. A stoichiometric ratio of less than 100 percent means there is less oxygen present than the amount necessary to completely combust the fuel present. i.e. fuel-rich conditions. A stoichiometric ratio greater than 100 percent means there is more oxygen present than the amount necessary to completely combust the fuel. i.e. excess oxygen conditions.

BRIEF DESCRIPTION OF THE DRAWINGS

FIG. 1 is a simplified cross-sectional representation of one embodiment of the invention wherein the gas layer above the charge is more oxidizing.

FIG. 2 is a simplified cross-sectional representation of another embodiment of the invention wherein the gas layer above the charge is more reducing.

DETAILED DESCRIPTION

The invention will be described in detail with reference to the drawings. Referring now to FIGS. 1 and 2, there is shown industrial furnace 1 which contains a charge 2. Any industrial furnace which is heated by one or more burners may be used in the practice of this invention. Examples of such furnaces include a steel reheating furnace wherein the charge is steel, an aluminum melting furnace wherein the charge is aluminum, a glass melting furnace wherein the charge comprises glassmaking materials, and a cement kiln wherein the charge comprises cement.

Fuel 6 and primary oxidant 7 are provided into furnace 1 at point 3 above charge 2 such as through burner 4. The fuel and primary oxidant may be injected into furnace 1 separately or together in a premixed condition. The fuel and primary oxidant may be provided into furnace 1 through a plurality of burners. Any suitable oxy-fuel burner may be employed in the practice of this invention. One particularly preferred oxy-fuel burner for use in the practice of this invention is the fuel jet burner disclosed in U.S. Pat. No. 5,411,395 to Kobayashi et al. which is incorporated herein by reference.

The fuel may be any gas or other fluid which contains combustibles which may combust in the combustion zone of the furnace. Among such fuels one can name natural gas, coke oven gas, propane, methane and oil.

The primary oxidant is a fluid having an oxygen concentration of at least 50 volume percent oxygen, preferably at least 90 volume percent oxygen. The primary oxidant may be commercially pure oxygen having an oxygen concentration of 99.5 percent or more.

The fuel and primary oxidant are provided into furnace 1 at flowrates such that the stoichiometric ratio of primary oxygen to fuel is less than 70 percent and preferably is within the range of from 5 to 50 percent of stoichiometric.

At least one of the fuel and primary oxidant are injected into furnace 1 at a velocity exceeding 100 feet per second (fps), preferably within the range of from 150 to 300 fps, in order to impart the requisite momentum to the combustion reactants. The fuel and primary oxidant combust within furnace 1 in a combustion reaction 5 to produce heat and combustion reaction products. Combustion reaction products may include products of complete combustion but, owing to the defined substoichiometric primary oxygen to fuel ratio, will include unburned fuel. The incomplete combustion of the fuel with the primary oxidant enables the combustion of fuel and primary oxidant to proceed at a substantially lower temperature than would otherwise be the case, thus reducing the tendency of NOx to form. The combustion reaction products may also include some residual oxygen because of incomplete mixing and short residence time during the combustion reaction although it is possible that the concentration of oxygen within the combustion reaction products is zero.

In the embodiment of the invention illustrated in FIG. 1 wherein an oxidizing gas layer is established over the charge surface, secondary oxidant 8 is provided within furnace 1 through lance 10 between point 3 and charge 2 to form secondary oxidant gas layer 9 proximate charge 2 and between combustion reaction 5 and charge 2. The secondary oxidant is preferably injected into the furnace at a point below point 3 although it may be provided into the furnace at the same level or even above point 3 and angled downward toward the charge. The secondary oxidant may be provided into the furnace from a point vertically below the fuel and primary oxidant, or from a point offset from the vertical, such as by an angle of up to 45 degrees.

In the embodiment of the invention illustrated in FIG. 2 wherein a reducing gas layer is established over the charge surface, secondary oxidant 8 is provided within furnace 1 through lance 10 above point 3. Preferably, in this embodiment the secondary oxidant is injected into the furnace at a point above point 3 although it may be provided into the furnace at the same level or even below point 3 and angled upward away from the charge. The secondary oxidant may be provided into the furnace from a point vertically above the fuel and primary oxidant, or from a point offset from the vertical, such as by an angle of up to 45 degrees.

The secondary oxidant is in the form of a fluid having an oxygen concentration of at least 50 mole percent, preferably at least 90 mole percent. The secondary oxidant may be commercially pure oxygen.

Secondary oxidant 8 is provided into furnace 1 at a velocity of at least 100 fps, and preferably at a velocity which the range of from 150 to 300 fps. It is important to the practice of this invention that the oxidant have an oxygen concentration significantly greater than that of air. For a given amount of fuel consumption, the total volume of gases passed through the furnace lessens as the oxygen concentration of the oxidant increases. This lower volume flux through the furnace, at the velocities required for the staged combustion practice of this invention, enables the establishment of the gas layer proximate the charge having a different composition than the contents in the rest of the furnace.

Secondary oxidant gas layer 9 has an oxygen concentration which exceeds that of the combustion reaction products within combustion reaction 5. Although any suitable oxygen lance may be used to inject the secondary oxidant into the furnace in the practice of this invention, it is preferred that the secondary oxidant be injected into the furnace using the gas injection lance disclosed in U.S. Pat. No. 5,295,816 to Kobayashi et al. which is incorporated herein by reference.

The secondary oxidant is provided into the furnace at a flowrate such that, when added to the primary oxidant, establishes a stoichiometric ratio with the fuel of at least 90 percent, and preferably within the range of from 100 to 110 percent. When the stoichiometric ratio of the primary and secondary oxidant to the fuel is less than 100 percent, the remaining oxygen needed to achieve complete combustion of the fuel within the furnace may be provided by infiltrating air. Preferably, the momentum ratio of the fuel and primary oxidant stream to the secondary oxidant stream is about 1.0 although some divergence from unity is acceptable, such as a momentum ratio within the range of from 0.3 to 2.0 or less.

A recent significant advancement in the field of staged combustion is disclosed in U.S. Pat. No. 5,242,296 to Tuson et al. The present invention differs from the typical staged combustion arrangement, such as that used in the aforesaid Tuson et al. technology, in that the secondary oxidant is provided within the furnace significantly below or above that of the point where the primary oxidant and fuel are injected into the furnace.

Heat generated in combustion reaction 5 radiates to the charge to heat the charge. This heat radiates from combustion reaction 5 to the charge either directly or through secondary oxidant gas layer 9. Very little heat is passed from the combustion reaction to the charge by convection.

Because of the position at which the secondary oxidant is provided into the furnace, there is formed either a more oxidizing or a more reducing gas layer which interacts with charge 2 in a manner which differs from the interaction which would occur were the furnace atmosphere homogeneous.

Downstream of combustion reaction 5 the secondary oxidant and the unburned fuel will mix, such as in region 11 within furnace 1, thus serving to complete the combustion of the fuel and provide additional heat and combustion reaction products within the furnace.

Preferably the combustion reaction products in furnace 1 are exhausted from the furnace from a point not below point 3 where fuel and primary oxidant are provided into the furnace, such as from flue 12.

In a preferred practice of the invention, where the gas layer proximate the charge is more oxidizing to the charge than the combustion reaction products, Xj/Ds exceeds 5 and preferably exceeds 10, and Xc/Ds is less than 100 and preferably is less than 50. Xj is the axial distance from the point where the secondary oxidant is injected into the furnace to the interaction point of the secondary oxidant with the fuel/primary oxidant combustion reaction stream. This interaction point is the point where the diverging cones with a half angle of 5 degrees from the fuel/primary oxidant and the secondary oxidant injection points first intersect. Ds is the equivalent jet diameter for the secondary oxidant and is defined as Ds=actual jet diameter multiplied by the square root of the (secondary oxidant jet density/furnace gas density). Xc is the axial distance from the point where the secondary oxidant is injected into the furnace to the jet-charge interaction point which is defined as the point where a diverging cone with a half angle of 5 degrees from the secondary oxidant injection point first intersects with the charge surface.

Although the invention has been discussed in detail with reference to certain embodiments, those skilled in the art will recognize that there are other embodiments of the invention within the spirit and the scope of the claims.

We claim:

1. A method for carrying out staged combustion comprising:

(A) injecting into a furnace which contains a charge, at a point above the charge, fuel and primary oxidant in a substoichiometric ratio not exceeding 70 percent of stoichiometric, said primary oxidant being a fluid comprising at least 50 mole percent oxygen, at least one of said fuel and primary oxidant being injected into the furnace at a velocity exceeding 100 feet per second;

(B) combusting fuel and primary oxidant within the furnace to produce heat and combustion reaction products including unburned fuel;

(C) providing secondary oxidant within the furnace above the injection point of the fuel and primary oxidant, said secondary oxidant being a fluid comprising at least 50 mole percent oxygen, at a velocity exceeding 100 feet per second;

(D) establishing a fuel rich gas layer proximate the charge, said fuel rich layer being more reducing to the charge than the secondary oxidant; and (E) combusting secondary oxidant with unburned fuel to provide additional heat and combustion reaction products within the furnace.

2. The method of claim 1 wherein the fuel and primary oxidant are injected into the furnace in a substoichiometric ratio within the range of from 5 to 50 percent of stoichiometric.

3. The method of claim 1 wherein combustion reaction products are withdrawn from the furnace at a point not below the point where fuel and primary oxidant are injected into the furnace.

4. The method of claim 1 wherein the charge comprises at least one of steel, aluminum, glassmaking material and cement.

5. The method of claim 1 wherein the secondary oxidant is provided at a flowrate sufficient to provide oxygen into the furnace so that the stoichiometric ratio of the primary and secondary oxidant to the fuel injected into the furnace is at least 90 percent.

* * * * *